UNITED STATES PATENT OFFICE.

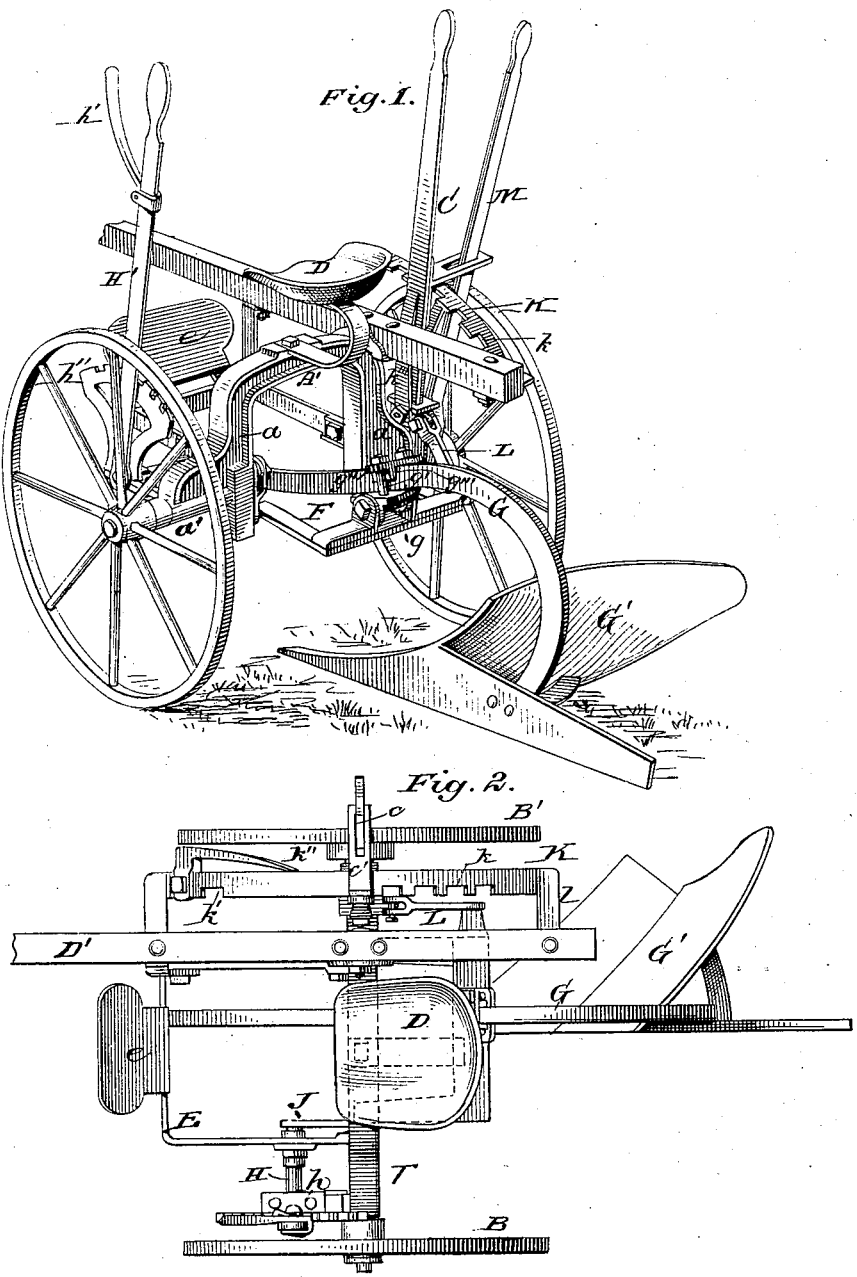

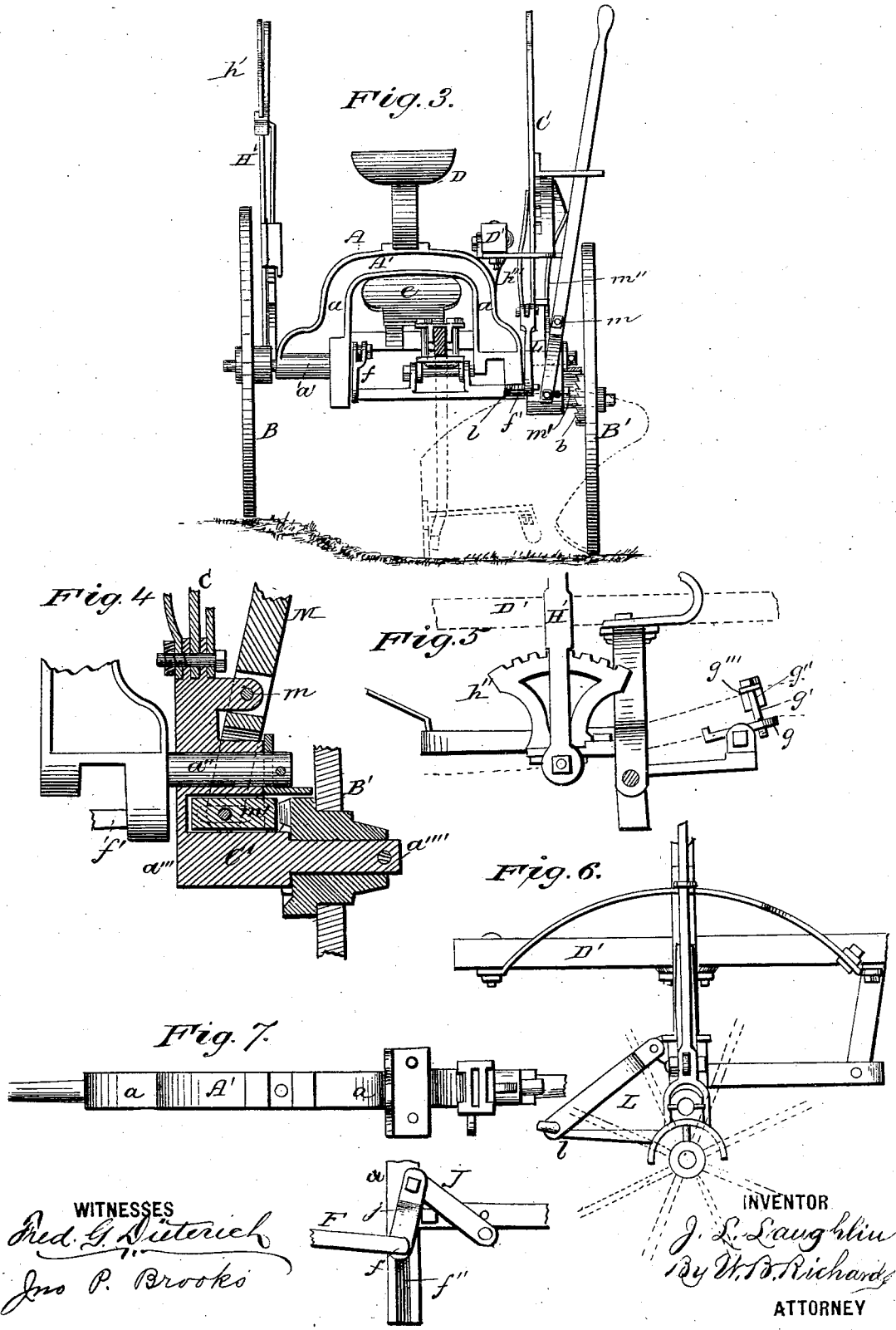

JOHN L. LAUGHLIN, OF RACINE, WISCONSIN.

WHEEL-PLOW.

SPECIFICATION forming part of Letters Patent No. 243,140, dated June 21, 1881.

Application filed April 7, 1880. (Model.)

*To all whom it may concern:*

Be it known that I, JOHN L. LAUGHLIN, a citizen of the United States, residing at Racine, in the county of Racine and State of Wisconsin, have invented certain new and useful Improvements in Wheel-Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in sulky-plows, in which the plow-beam is connected with the fixed central part of the axle by means of a yoke or bail hinged at its ends to the axle and at its central part to the plow-beam, and adapted to raise and lower the plow by oscillating the yoke or bail; and the objects of my improvements are, first, to afford facilities for "winging" or turning the plow with either side higher than the other; second, to provide means for raising the plow from the ground which may be operated by the draft-animals; third, to provide means for regulating the depth of plowing. I attain these objects by the mechanism illustrated in the accompanying drawings, in which—

Figure 1 is a perspective of the entire machine except part of the tongue. Fig. 2 is a top plan. Fig. 3 is a rear elevation, the plow in dotted lines. Fig. 4 is a detail section, hereinafter referred to. Fig. 5 is a vertical sectional elevation, showing the left-hand side of the machine. Fig. 6 is an elevation showing the right-hand side of the machine, the wheel in dotted lines. Fig. 7 is a plan of the bail or yoke alone.

Referring to the drawings by letters, the same reference-letter indicating the same part in the different figures, letter A represents the axle, formed of a central elevated part, A', vertical side parts, $a$, and horizontal parts $a'$ $a''$.

A supporting-wheel, B, is journaled on the part $a'$, and an arm or lever, $a'''$, is journaled on the part $a''$, the upper end of which is extended to form a lever, C, and the lower end, C', of which carries a horizontal journal, $a''''$, for the wheel B'.

D is the driver's seat, and D' the tongue or guide-pole, both secured to the axle in the ordinary manner.

E is an ordinary rectangular frame projecting forward from the axle, and provided with a foot-rest, $e$, at its front side.

F is a bail, formed as shown in the drawings, and has a lateral stud, $f$, on one end and a similar stud, $f'$, on its other end. The stud $f'$ is journaled in the adjacent portion $a$ of the axle, and the stud $f$ is seated in a slot or groove, $f''$, in the side $a$ of the axle adjacent to it, so that the rear end or side of the bail F may be raised and lowered on the studs $f$ $f'$ as journals, and the stud $f$ may be slid up and down in the groove $f''$, for the purpose of raising and lowering that side of the bail.

G is the plow-beam, with an attached plow, G'. A plate, $g$, is secured to the beam G by a stirrup, $g'$, and a bolt, $g''$, passes through ears $g'''$, projecting respectively from the plate $g$ and from the rear side of the bail F, so that the plow may be oscillated in a vertical plane lengthwise of the beam on the bolt $g''$ as a journal, and be held firmly against lateral oscillation, either horizontally or vertically.

H is a rock-shaft, journaled in bearings in the frame E and a standard, $h$, which projects forward from the axle.

H' is a lever fixed to the outer end of the rock-shaft, and provided with a spring-pawl, $h'$, by means of which it may be fixed at different angles by engaging the pawl with a segment rack-bar, $h''$.

J is an arm attached at one end to the inner end of the rock-shaft H, and at its other end journaled to one end of a link, $j$, the other end of which link is journaled to the stud $f$ on the bail F, so that by throwing the lever H' forward the adjacent side of the bail F may be raised, and by throwing the lever rearward the adjacent side of the bail be lowered to level the plow or to incline it to either side, as may be desired, in opening first furrows, plowing on hillsides, or for other purposes.

K is a segment rack-bar secured to the side of the tongue, and provided with notches $k$ at its rear end and notch $k'$ at its forward end, and on its side next to the tongue and next to the lever C, and further provided with an inclined arm or cam, $k''$, at its forward end and outer side. The lever C is pressed toward the bar K by a spring, $k'''$.

L is a link journaled at one end to the lever C, a short distance above its fulcrum, on the part $a''$ of the axle, and at its other end to an arm, $l$, which projects laterally from the rear part of the bail F, and thus connects the lever C and bail F, so that when the lever C is thrown forward or its end below the fulcrum $a''$ thrown backward the outer end of the bail F will be raised, and vice versa.

M is a lever, pivoted at $m$ to a stud which projects from the arm $a'''$, and its lower forked end journaled to a sliding dog, $m'$, which is seated in a socket in the arm $a'''$ in such manner that it may be thrust outward to engage with ratchet-teeth $b$ on the inner end of the hub of the wheel B'. The upper end of the lever M passes through a slot, $c$, in an arm, $c'$, which projects laterally from the lever C. The lever M is pressed outward from the bar K at its upper end and against the outer end of the slot $c$ in the arm $c'$ by a spring, $m''$, so as to keep the dog $m'$ retracted and disengaged with the teeth $b$ when the lever M is in its normal position. While the lever M is in the position last described, the lever C may be drawn inward so as barely to clear the teeth in the bar K, and be adjusted in different notches $k$ therein, for the purpose of adjusting the depth of plowing.

To raise the plow from the ground for local transportation, for turning around, or other purposes, the lever M may be drawn toward the bar K until it strikes the inner end of the slot $c$ in the arm $c'$, when it will carry the lever C with it and release the lever C from the bar K. Both levers may then be moved enough to force the dog $m'$ outward, so that it will engage with the teeth $b$ in the hub of the wheel B', and thus lock the wheel B' with the arm or lever $a'''$, and thereby rotate the upper end of the lever $a'''$ C forward and the lower arm or lever $a'''$ rearward and lift the plow from the ground by the draft of the draft-animals when the machine is moving forward.

In passing forward, as last described, the lever M will strike the cam $k''$, which will force the upper end of the lever outward, and thereby release the dog $m'$ from the teeth $b$, and at the same time the lever C will engage with the notch $k'$ in the bar K and retain the plow in an elevated position until the lever C is released from the notch $k'$ and turned rearward to again lower the plow into working position. In raising the plow from the ground the arm $a'''$ assumes such an angle, as shown by dotted lines at Fig. 6, that the weight of the frame and driver aids in rotating lever $a'''$ and in raising the plow.

When the machine is not moving forward the driver may raise the plow from the ground by barely releasing the lever C from the notches $k$ and pressing it forward to the notch $k'$ by hand.

I am aware that it is not new in wheel-plows to lock the wheel for raising the plow by the draft, nor to automatically unlock it when the plow has been raised, and such I do not claim broadly; but,

Having thus described my invention, what I claim as new, and desire to secure by Letters Patent, is—

1. The arm $a'''$, journaled on the end of the axle A, and carrying the wheel B' at its lower end and lever C at its upper end, in combination with the axle A and plow and yoke F, which is journaled to the axle and connected with the arm $a'''$ by a link, L, substantially as and for the purpose specified.

2. In combination with the axle A and yoke F, hinged to the axle, and to which the plow is attached, the arm $a'''$, journaled on the axle A, and the lever M, provided with a dog, $m'$, adapted to engage with the notched hub of the wheel B', and thereby oscillate the arm $a'''$ and yoke F, which is connected therewith by a link, L, and raise the plow by the draft of the team, substantially as and for the purpose specified.

3. In combination with the arm $a'''$, journaled on the end of the axle A, the levers C and M, connected by a slotted arm, $c$, substantially as described, and for the purpose specified.

4. In combination with the arm $a'''$, journaled on the axle A, and levers C and M, which may be oscillated together and are adapted to raise the plows by the draft of the team, the rack-bar K, having a cam-projection, $k''$, on its front end, substantially as and for the purpose set forth.

5. In a wheel or sulky plow, the combination of the arched axle A, having a slot, $f''$, in one of its vertical sides, the yoke F, journaled at one end to the vertical side part of the axle and its other end seated in the slot $f''$ in the axle, link $j$, arm J, rock-shaft H, and lever H', substantially as and for the purpose herein shown and described.

In testimony whereof I affix my signature in presence of two witnesses.

JOHN L. LAUGHLIN.

Witnesses:
GEORGE E. CROSBY,
WM. A. MORTON.